(12) United States Patent
Wayman

(10) Patent No.: US 7,100,544 B1
(45) Date of Patent: Sep. 5, 2006

(54) PNEUMATIC CONE CLUTCH FAN DRIVE HAVING THREADED ATTACHMENT METHOD FOR DRIVE SHAFT OF CLUTCH TO HUB MOUNTING

(75) Inventor: Nathaniel Eric Wayman, Cadillac, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 11/192,613

(22) Filed: Jul. 29, 2005

(51) Int. Cl.
*F01P 7/02* (2006.01)

(52) U.S. Cl. .............................. 123/41.12; 123/198 P; 123/559.3; 123/197.5; 192/66.2

(58) Field of Classification Search ............ 123/41.12, 123/41.11, 198 P, 559.3, 197.5; 192/84.1, 192/111 B, 111 A, 66.2, 66.21, 66.22, 66.23
See application file for complete search history.

(56) References Cited

U.S. PATENT DOCUMENTS

| | | | |
|---|---|---|---|
| 2,858,920 A | 11/1958 | Doble | |
| 2,902,127 A | 9/1959 | Hardy | |
| 2,990,045 A | 6/1961 | Root | |
| 3,568,647 A | 3/1971 | Adams | |
| 3,757,914 A * | 9/1973 | Elmer | 192/48.3 |
| 3,792,697 A * | 2/1974 | Walter et al. | 123/41.12 |
| 4,119,184 A | 10/1978 | Mower et al. | |
| 4,132,301 A * | 1/1979 | Zabonick | 192/85 AA |
| 4,355,710 A | 10/1982 | Schilling | |
| 4,456,110 A | 6/1984 | Hanks et al. | |
| 5,669,336 A | 9/1997 | Williams | |
| 5,845,757 A | 12/1998 | Csonka | |
| 5,947,853 A | 9/1999 | Hodjat et al. | |
| 6,173,492 B1 | 1/2001 | Moser | |
| 6,468,037 B1 | 10/2002 | Link | |
| 6,830,140 B1 | 12/2004 | Zink et al. | |

* cited by examiner

*Primary Examiner*—Tony M. Argenbright
*Assistant Examiner*—Katrina Harris
(74) *Attorney, Agent, or Firm*—Greg Dziegielewski, Esq.; Artz & Artz, P.C.

(57) ABSTRACT

An on/off clutch assembly is disclosed having a simplified method for attaching the drive shaft to the hub portion of the drive pulley. The rotating shaft is formed with an integral external threaded portion that is designed to mate with a corresponding internal threaded portion of the hub. The external threaded portion, in conjunction with the internal threaded portion, replace the holes and corresponding cap screws that are used to attach the drive shaft to the hub in current designs. The new design limits the complexity of design and manufacture of the fan drive.

15 Claims, 2 Drawing Sheets

PNEUMATIC CONE CLUTCH FAN DRIVE HAVING THREADED ATTACHMENT METHOD FOR DRIVE SHAFT OF CLUTCH TO HUB MOUNTING

TECHNICAL FIELD

The present invention relates generally to a cone clutch fan drives and more particularly to a pneumatic cone clutch fan drive having a threaded attachment method for coupling the drive shaft of the clutch to the hub mounting.

BACKGROUND OF THE INVENTION

Vehicle engines commonly utilize cooling assemblies to remove excess heat from the engine and maintain an optimal operating temperature. The cooling assembly pumps a coolant through the engine and other components in order to control engine temperature. Heat generated within the engine and other components is absorbed by the coolant and dispersed into the surrounding atmosphere through the use of a radiator. In order to improve dispersal by the radiator, it is common to utilize fan assemblies to draw or force air past the radiator to assist in temperature transmission.

It is not always desirable for such fan assemblies to be run continuously. At times, it is desirable for the temperature within the coolant to increase rather than decrease. Additionally, continuous operation when unnecessary places a non-required draw on the engine and thereby reduces efficiency. To compensate for this, present fan assemblies utilize fan clutch assemblies that allow for the selective engagement of the fan to the engine such that the fans are engaged only when necessary.

The present invention relates to friction coupling devices that drive radiator-cooling fans. A common friction-coupling device is that of the dry friction drive style, otherwise referred to interchangeably hereinafter with a friction clutch assembly. Dry friction drives are used for their simplicity, cool operating temperature, and ability to turn at fully engaged peak operating speeds.

Although the present invention may be used advantageously in various configurations and applications, it is especially advantageous in a coupling device of the type used to drive a radiator cooling fan of an internal combustion engine for a over the road truck, such as a class 8 truck, and will be described in connection therewith.

Dry friction drives tend to have two operating conditions "ON and OFF", which refers to when an associated friction clutch is either fully engaged or fully disengaged. When a friction clutch assembly is fully engaged, the assembly provides cooling to an associated engine and is not slipping. When a friction clutch assembly is fully disengaged slippage between the clutch plate and an engagement surface is at a maximum, thus providing little rotational output to drive an associated fan.

In order to attach the clutch to the pulley/bracket assembly, a series of holes are first introduced to the drive shaft and hub portion of the pulley/bracket assembly. A cap screw is then inserted within each of the holes to couple the clutch to the pulley/bracket assembly. These holes and cap screws are complex and add costs to the clutch assembly in terms of raw material costs, manufacturing costs, and assembly costs. It would be highly desirable to minimize these costs by simplifying the design of the coupling.

SUMMARY OF THE INVENTION

It is therefore an object to the present invention to provide a clutch assembly with a simplified method for attaching the drive shaft to the hub portion of the drive pulley.

In accordance with the objects of the present invention, the rotating shaft is formed with an integral external threaded portion that is designed to mate with a corresponding internal threaded portion of the hub. The threaded portions replace the holes and corresponding cap screws that are traditionally used to attach the drive shaft to the hub of the drive pulley. The new design limits the complexity of design and manufacture of the fan drive.

Other objects and features of the present invention will become apparent when viewed in light of the detailed description and preferred embodiment when taken in conjunction with the attached drawings and claims.

DESCRIPTION OF PREFERRED EMBODIMENTS

Figure 1:
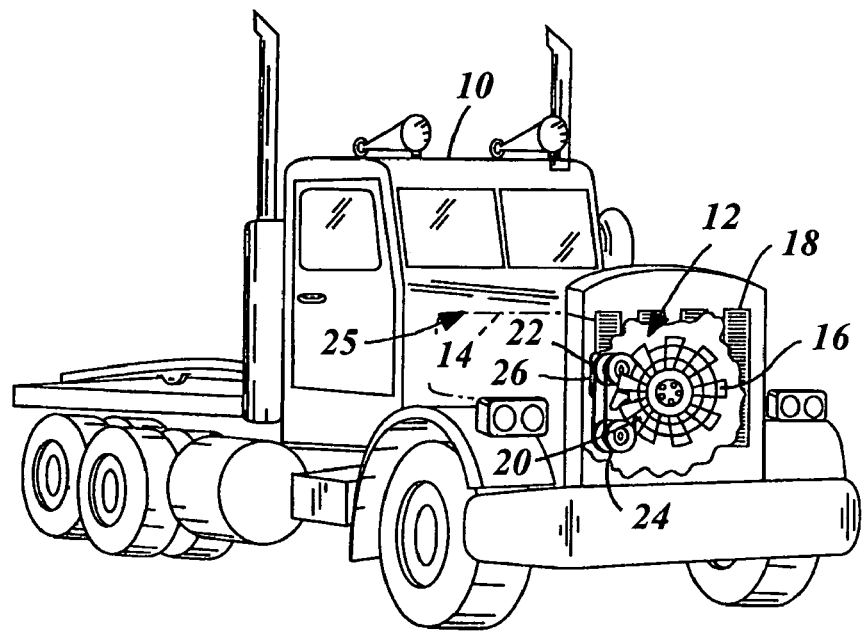
FIG. 1 is a perspective view of a vehicle utilizing a friction clutch assembly in accordance with an embodiment of the present invention.

In the following figures the same reference numerals will be used to refer to the same components. While the present invention is described primarily with respect to a cone clutch fan drive system, the present invention may be adapted and applied to various systems including: hydraulic systems, electrical systems, pneudraulic systems, mechanical systems, pneumatic systems, vehicle systems, cooling systems, fan drive systems, friction drive systems, or other systems.

In the following description, various operating parameters and components are described for one constructed embodiment. These specific parameters and components are included as examples and are not meant to be limiting.

Also, in the following description various fan drive components and assemblies are described as an illustrative example. The fan drive components and assemblies may be modified depending upon the application.

Referring now to FIG. 1, a perspective view of a vehicle 10 utilizing a fluidically controlled fan drive system 12 in accordance with an embodiment of the present invention is shown. The system 12 uses rotational energy from a liquid cooled engine 14 at an increased ratio to turn a radiator-cooling fan 16 to provide airflow through a radiator 18. The system 12 includes a friction clutch assembly 20 that is fixed to one or more pulleys, such as pulley 22, which is coupled to and rotates relative to a crankshaft (not shown) of the engine 14. The pulleys rotate via a pair of belts 24, within an engine compartment 25. Of course, the present invention may be relatively operative in relation to various components and via any number of belts or other coupling devices, such as a timing chain. The friction clutch assembly 20 is mounted on the engine 14 via a mounting bracket 26. The friction clutch assembly 20 pneumatically engages the fan 16 during desired cooling intervals to reduce the temperature of the engine 14.

The fan 16 may be attached to the friction clutch assembly 20 by any suitable means, such as is generally well known in the art. It should be understood, however, that the use of the present invention is not limited to any particular configuration of the system 12, or fan mounting arrangement, or any particular application for the system 12, except as is specifically noted hereinafter.

Figure 2:
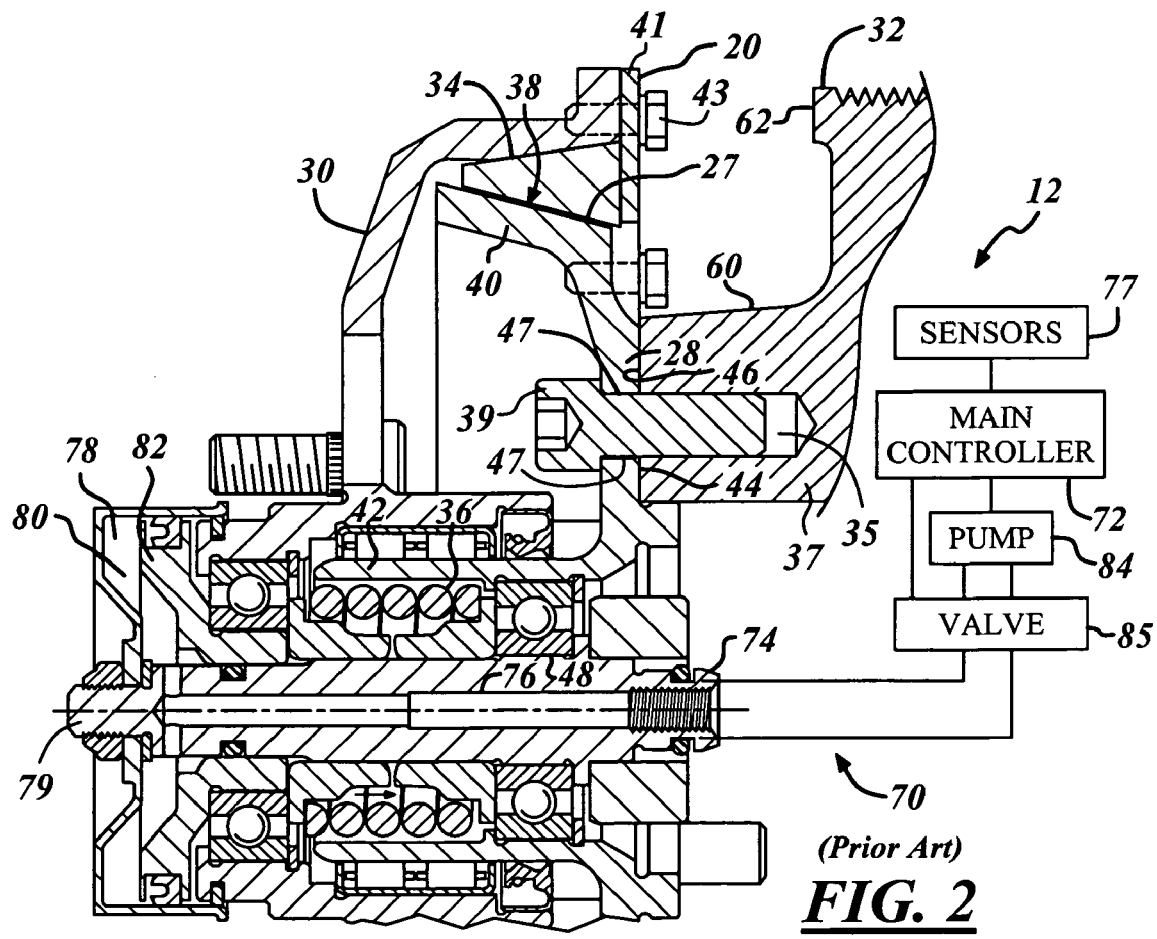
FIG. 2 is a quarter side cross-sectional view of a friction clutch assembly in accordance with an embodiment of the prior art.
Figure 3:
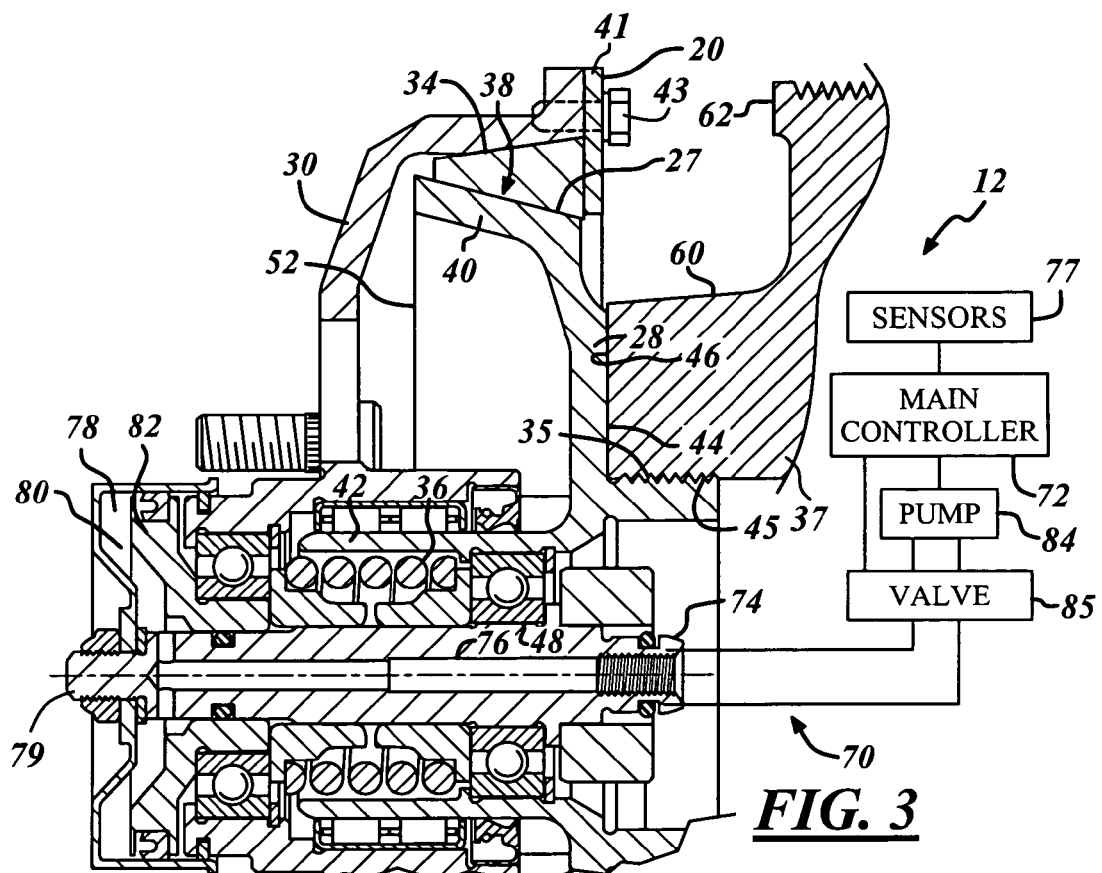
FIG. 3 is an illustration of cone clutch fan drive in accordance with the present invention in a clutch engaged position.
Figure 4:
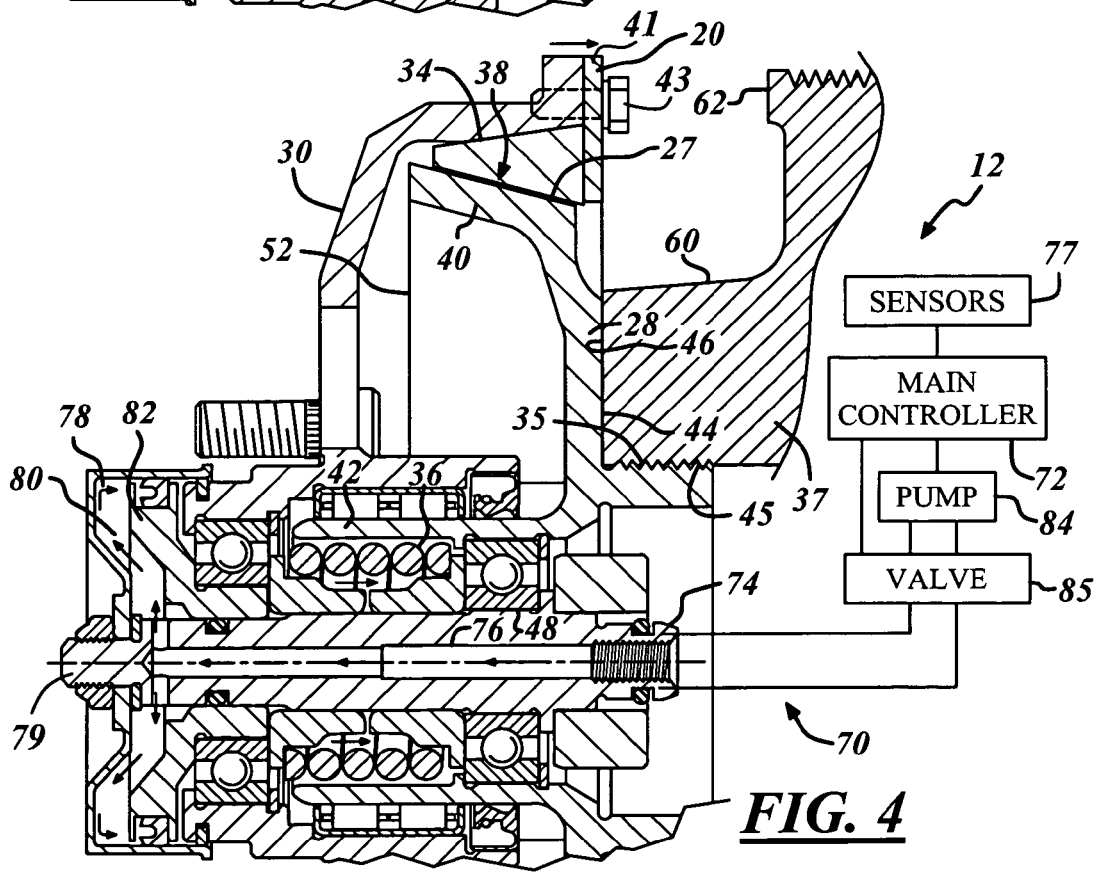
FIG. 4 is an illustration of cone clutch fan drive in accordance with the present invention in the clutch-disengaged position.

Referring now to FIGS. 2–4, a quarter side cross-sectional view of the friction clutch assembly 20 having a rotating shaft 27 with a thermal energy transfer portion 28 in an engaged position accordance with an embodiment of the prior art (FIG. 2) and according to a preferred embodiment of the present invention in both the engaged (FIG. 3) and disengaged position (FIG. 4). As will be described further below, a new and simplified method for coupling the transfer portion 28 to the hub portion 37 is disclosed in the present invention as presented in FIGS. 3 and 4.

The assembly 20 includes a translatable clutch housing 30 and a drive shaft 27 that is coupled to and rotates with the drive pulley 32. The clutch housing 30 is attached to an engine-cooling fan, such as fan 16. A friction liner 34 is coupled to the clutch housing 30 using a series of stamped plates 41 and screws 43 (the cross section shows one plate 41 and a pair of screws 43) and resides between the clutch housing 30 and the rotating drive shaft 27.

A clutch spring 36 engages the clutch housing 30 with the drive shaft 27 in a friction clutch engagement area 38. In operation, the drive pulley 32 rotates in turn rotating the drive shaft 27, which when engaged rotates the translatable clutch housing 30. The rotation of the housing 30 is translated to a coupled radiator-cooling fan 16 to provide airflow through a radiator 18.

During engagement of the clutch housing 30, thermal energy is generated by the contact between the friction liner 34 and the shaft 27, and a certain amount of the thermal energy is transferred through the transfer portion 28 into the drive pulley 32.

The drive shaft 27 has the transfer portion 28, as well as a friction contact portion 40 and a spring/bearing portion 42. The transfer portion 28 is generally vertical in orientation, whereas the friction contact portion 40 and the spring/bearing portion 42 are generally horizontal in orientation. A bearing 48 couples the spring/bearing portion 42 to a non-rotating shaft 79. The transfer portion 28 has a pulley contact surface 44 that corresponds with a shaft contact surface 46 on the drive pulley 32.

The drive pulley 32 includes a center protruding portion 60 and a pulley portion 62. The center portion 60 extends forward away from the pulley portion 62 and is in contact with the shaft 27. The center portion 60 includes the shaft contact surface 46 and is coupled to the drive shaft 27. The pulley 32 performs as a heat sink and as such may be formed of various thermal energy conductive or heat sink materials known in the art. The pulley 32 may, for example, be formed of steel, aluminum, copper, or a combination thereof.

The friction clutch assembly 20 also includes a fluidic control circuit 70 that is operated via a main controller 72. The fluidic control circuit 70 includes a piston rod or pneumatic transfer conduit 74 with a fluid channel 76 residing therein for the transfer of fluid, such as air, into a piston reservoir 78 of a fluid cylinder 80. The fluid cylinder 80 resides over a piston 82. A fluid pump 84 and a corresponding valve 85 are fluidically coupled to the fluid channel 76. The main controller 72 is coupled to the pump 84 and to the valve 85 and adjusts the flow of the fluid into and out of the reservoir 78. The valve 85 may, for example, be in the form of a solenoid.

The main controller 72 may be contained within the system 12 or may be separate from the system 12 as shown. The main controller 72 may be microprocessor based such as a computer having a central processing unit, memory (RAM and/or ROM), and associated input and output buses. The main controller 72 may be a portion of a central vehicle main control unit, an interactive vehicle dynamics module, a cooling system controller, or may be a stand-alone controller as shown. The main controller 72 may be coupled to a plurality of sensors 77 located throughout the engine that give inputs regarding particular engine operating conditions. The main controller 72 interprets these signals to adjust the flow of fluid into and out of the fluid reservoir 78, therein precisely controlling the engagement or disengagement of the friction clutch assembly and therein precisely controlling the engine operating temperature to achieve a desired balance of engine performance characteristics such as fuel economy and emission.

The friction clutch assembly 20 is frequently engaged, as shown in FIGS. 2 and 3. When engaged no fluid is pumped into the reservoir 78. The piston 82 and thus the housing 30 are in a fully engaged position. In the engaged position the spring 36 is decompressed or in an expanded state.

When cooling is no longer desired the main controller 72 pumps fluid into the reservoir 78, which causes the piston 82 to shift rearward (rightward in FIG. 4), towards the shaft 27. As the piston 82 shifts rearward, the housing 30 also shifts rearward, thereby, compressing the spring 36 and causing the friction liner 34 and thus the housing 30 to disengage with the drive shaft 27. This is the so-called disengaged position as shown in FIG. 4.

Of course, in other preferred embodiments, the engagement and disengagement mechanism of a preferred embodiment of the present invention may be reversed, wherein the clutch mechanism is maintained in a disengaged state in the absence of activation from the main controller and still fall within the spirit of the present invention.

As shown in FIG. 2 and known in the prior art, the rotating shaft 27 is coupled within an internal threaded portion 35 of a hub portion 37 of the drive pulley 32, within the transfer portion 28, utilizing one or more cap screws 39. To accomplish this, the transfer portion 28 includes corresponding holes 47 through which the cap screws 39 are inserted. Typically, six cap screws 39 and holes 47 are needed.

In the preferred embodiment of the present invention, as shown in FIGS. 3 and 4, the transfer portion 28 is formed having one or more external threaded portions 45. Each respective external threaded portion 45 is secured within the corresponding threaded opening 35 of the hub portion 37 during assembly. The external threaded portion 45 therefore replaces the cap screws 39 of the prior art, and simplifies the manufacture of the transfer portion 28 of the rotating drive shaft 27 by eliminating the need to form holes 47 within the transfer portion 28.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An on/off fan drive system of an engine comprising:
a drive pulley coupled to and rotatable with an engine crankshaft, said engine crankshaft rotating at a given engine speed, said drive pulley having a hub, said hub having an internal threaded portion;
a translatable clutch housing coupled to a fan;
a drive shaft having an external threaded portion positioned within said translatable clutch housing, said external threaded portion coupled within said internal threaded portion of said hub;
a friction liner residing between and engageable with said translatable clutch housing and said drive shaft;
a clutch spring positioned between said drive shaft and said cone clutch element, said clutch spring biasing said translatable clutch housing into an engaged position with a clutch engagement force, said engaged position defined wherein said friction liner is fully engaged with said drive shaft to rotate said translatable clutch housing as a function of a rotational rate of said drive shaft; and
a fluidic control circuit coupled to said translatable clutch housing and capable of moving said translatable clutch housing between said engaged position and a disengaged position, said disengaged position defined wherein said friction liner is disengaged from said drive shaft and prevents rotation of said translatable clutch housing as a function of said rotational rate of said drive shaft.

2. The fan drive system of claim 1, wherein said fluidic control circuit comprises:
a pneumatic transfer conduit coupled within said rotating drive shaft said pneumatic transfer conduit including a piston coupled to a shaft having a fluid channel, said piston coupled with said translatable clutch housing;
a fluid cylinder coupled to said pneumatic transfer circuit;
a piston reservoir fluidically coupled to said fluid channel, said piston reservoir defined between said fluid cylinder and said piston;
a clutch spring positioned between said shaft and said rotating drive shaft, said clutch spring biasing said piston and said translatable clutch housing into said engaged position with a clutch engagement force;
a fluid pump having a valve coupled to said fluid channel, said fluid pump introducing a quantity of fluid from said fluid pump through said fluid channel to said piston reservoir, wherein said quantity of fluid acts to push said piston against said clutch spring, therein moving said translatable clutch from said engaged position to said disengaged position;
wherein said main controller controls said quantity of fluid within said reservoir.

3. The fan drive system of claim 2, wherein said friction coupling assembly further comprises one or more sensors electrically coupled to said main controller, said one or more sensors sending an electronic signal to said main controller as a function of an engine operating condition.

4. The fan drive system of claim 1, wherein said fluidic control circuit comprises:
a pneumatic transfer conduit coupled within said rotating drive shaft, said pneumatic transfer conduit including a piston coupled to a shaft having a fluid channel, said piston coupled with said translatable clutch housing;
a fluid cylinder coupled to said pneumatic transfer circuit;
a piston reservoir fluidically coupled to said fluid channel, said piston reservoir defined between said fluid cylinder and said piston;
a clutch spring positioned between said shaft and said rotating drive shaft, said clutch spring biasing said piston and said translatable clutch housing into said disengaged position with a clutch engagement force;
a fluid pump having a valve coupled to said fluid channel, said fluid pump introducing a quantity of fluid from said fluid pump through said fluid channel to said piston reservoir, wherein said quantity of fluid acts to push said piston against said clutch spring, therein moving said translatable clutch from said disengaged position to said engaged position;
wherein said main controller controls said quantity of fluid within said reservoir.

5. The fan drive system of claim 4, wherein said friction coupling assembly further comprises one or more sensors electrically coupled to said main controller, said one or more sensors sending an electronic signal to said main controller as a function of an engine operating condition.

6. A method for forming an engine cooling system for an engine, the method comprising:
(a) providing an engine having a engine crankshaft, said engine crankshaft rotating at a given engine speed;
(b) coupling a drive pulley to said engine crankshaft, said drive pulley having a hub, said hub having an internal threaded portion;
(c) providing a friction clutch assembly comprising:
a translatable clutch housing coupled to a fan;
a drive shaft having an external threaded portion positioned within said translatable clutch housing;
a friction liner residing between and engageable with said translatable clutch housing and said drive shaft;
a clutch spring positioned between said shaft and said drive shaft, said clutch spring biasing said translatable clutch housing into an engaged position with a clutch engagement force, said engaged position defined wherein said friction liner is fully engaged with said drive shaft to rotate said translatable clutch housing as a function of a rotational rate of said drive shaft; and
a fluidic control circuit having a main controller coupled to said translatable clutch housing and capable of moving said translatable clutch housing between said engaged position and a disengaged position, said disengaged position defined wherein said friction liner is disengaged from said drive shaft
(d) coupling a fan to said friction clutch assembly; and
(e) coupling said friction clutch assembly to said drive pulley by securing said external threaded portion of said drive shaft within said internal threaded portion of said hub.

7. The method of claim 6, further comprising coupling at least one sensor to said main controller, said at least one sensor capable of measuring an engine operating parameter.

8. The method of claim 6, wherein said fluidic control circuit comprises:
a pneumatic transfer conduit coupled within said drive shaft, said pneumatic transfer conduit including a piston coupled to a shaft having a fluid channel, said piston coupled with said translatable clutch housing;
a fluid cylinder coupled to said pneumatic transfer circuit;
a piston reservoir fluidically coupled to said fluid channel, said piston reservoir defined between said fluid cylinder and said piston;
a clutch spring positioned between shaft and said drive shaft, said clutch spring biasing said piston and translatable clutch housing into said engaged position with a clutch engagement force;

a fluid pump having a valve coupled to said fluid channel, said fluid pump introducing a quantity of fluid from said fluid pump through said fluid channel to said piston reservoir, wherein said quantity of fluid acts to push said piston against said clutch spring, therein moving said translatable clutch from said engaged position to said disengaged position;

wherein said main controller controls said quantity of fluid within said reservoir.

9. The method of claim 6, wherein said fluidic control circuit comprises:

a pneumatic transfer conduit coupled within said drive shaft, said pneumatic transfer conduit including a piston coupled to a shaft having a fluid channel, said piston coupled with said translatable clutch housing;

a fluid cylinder coupled to said pneumatic transfer circuit;

a piston reservoir fluidically coupled to said fluid channel, said piston reservoir defined between said fluid cylinder and said piston;

a clutch spring positioned between shaft and said drive shaft, said clutch spring biasing said piston and said translatable clutch housing into said disengaged position with a clutch engagement force;

a fluid pump having a valve coupled to said fluid channel, said fluid pump introducing a quantity of fluid from said fluid pump through said fluid channel to said piston reservoir, wherein said quantity of fluid acts to push said piston against said clutch spring, therein moving said translatable clutch from said disengaged position to said engaged position;

wherein said main controller controls said quantity of fluid within said reservoir.

10. An engine cooling system comprising:

(a) an engine having a crankshaft, said crankshaft rotating at a given engine speed;

(b) a radiator coupled to said engine;

(c) a drive pulley coupled to and rotating with said crankshaft, said drive pulley having a hub, said hub having an internal threaded portion;

(d) a friction coupling assembly mounted to said engine and coupled with said drive pulley, said friction clutch assembly comprising;

a translatable clutch housing having an inner groove;

a drive shaft having an external threaded portion, said external threaded portion coupled within said internal threaded portion of said drive pulley; and a friction liner residing between and engageable with said rotating shaft and said translatable clutch housing, said engagement thereof causing said translatable clutch portion to rotate when said friction liner is engaged with said drive shaft at said given engine speed; and (e) a fan coupled to said translatable clutch system and capable of rotating with said translatable clutch system to provide cooling airflow to said radiator.

11. The engine cooling system of claim 10, wherein said friction coupling assembly further comprising a fluidic control circuit coupled to said translatable clutch housing and capable of moving said translatable clutch housing between an engaged position and a disengaged position, said engaged position defined wherein said friction liner is fully engaged with said drive shaft to rotate said translatable clutch housing as a function of a rotational rate of said drive shaft and wherein said disengaged position is defined wherein said friction liner is disengaged from said drive shaft; and a main controller for controlling the relative location of said translatable clutch housing between said engaged position and said disengaged position.

12. The engine cooling system of claim 11, wherein said fluidic control circuit comprises:

a pneumatic transfer conduit coupled within said rotating drive shaft, said pneumatic transfer conduit including a piston coupled to a shaft having a fluid channel, said piston coupled with said translatable clutch housing;

a fluid cylinder coupled to said pneumatic transfer circuit;

a piston reservoir fluidically coupled to said fluid channel, said piston reservoir defined between said fluid cylinder and said piston;

a clutch spring positioned between said shaft and said drive shaft, said clutch spring biasing said piston and said translatable clutch housing into said engaged position with a clutch engagement force;

a fluid pump having a valve coupled to said fluid channel, said fluid pump introducing a quantity of fluid from said fluid pump through said fluid channel to said piston reservoir, wherein said quantity of fluid acts to push said piston against said clutch spring, therein moving said translatable clutch from said engaged position to said disengaged position;

wherein said main controller controls said quantity of fluid within said reservoir.

13. The engine cooling system of claim 12, wherein said friction coupling assembly further comprises one or more sensors electrically coupled to said main controller, said one or more sensors sending an electronic signal to said main controller as a function of an engine operating condition.

14. The engine cooling system of claim 12, wherein said fluidic control circuit comprises:

a pneumatic transfer conduit coupled within said rotating drive shaft, said pneumatic transfer conduit including a piston coupled to a shaft having a fluid channel, said piston coupled with said translatable clutch housing;

a fluid cylinder coupled to said pneumatic transfer circuit;

a piston reservoir fluidically coupled to said fluid channel, said piston reservoir defined between said fluid cylinder and said piston;

a clutch spring positioned between said shaft and said drive shaft, said clutch spring biasing said piston and said translatable clutch housing into said disengaged position with a clutch engagement force;

a fluid pump having a valve coupled to said fluid channel, said fluid pump introducing a quantity of fluid from said fluid pump through said fluid channel to said piston reservoir, wherein said quantity of fluid acts to push said piston against said clutch spring, therein moving said translatable clutch from said disengaged position to said engaged position;

wherein said main controller controls said quantity of fluid within said reservoir.

15. The engine cooling system of claim 14 further comprising one or more sensors electrically coupled to said main controller, said one or more sensors sending an electronic signal to said main controller as a function of an engine operating condition.

* * * * *